Dec. 9, 1958  F. C. MESERVE ET AL  2,863,507
MACHINE AND PROCESS FOR SLITTING OR SIPING TIRES
Filed Aug. 21, 1956  3 Sheets-Sheet 1

INVENTORS
F. Clayton Meserve &
Minot F. Smith
by Kenway, Jenney, Witter & Hildreth
Attys.

Dec. 9, 1958  F. C. MESERVE ET AL  2,863,507
MACHINE AND PROCESS FOR SLITTING OR SIPING TIRES
Filed Aug. 21, 1956  3 Sheets-Sheet 3

INVENTORS
F. Clayton Meserve &
Mendt F. Smith
by Kenway, Jenney, Witter & Hildreth
Att'ys.

2,863,507
MACHINE AND PROCESS FOR SLITTING OR SIPING TIRES

Forrest Clayton Meserve, North Andover, and Minot F. Smith, Wellesley Hills, Mass., assignors to Micro Machinery Products, Inc., Winchester, Mass., a corporation of Massachusetts Application August 21, 1956, Serial No. 605,298

8 Claims. (Cl. 164—10.2)

This invention relates to the siping or transverse slitting of vehicle tires. In one aspect it consists in improvements on the process and machine described in our prior Patent No. 2,741,307 in that it increases the range of operations carried out in accordance therewith. It also provides for siping of a new character for which the earlier machine was not adapted.

Our prior patent discloses a process characterized by progressively conforming the tread of the tire, in successive areas, to the contour of a worm thread, rotating the tire by turning the worm thread while it temporarily indents but does not cut the tire and moving a knife through the tread of the tire in a path corresponding to the pitch of said worm thread and following the formation of the indentations made by the worm threads. In the machine shown in that patent, however, the relative position of the drum on which the worm thread is formed and the tire is established once for all and the slits are formed at a predetermined acute angle with respect to the axis of the tire.

Experience and tests have shown that in siping certain types of tires decidedly better results are secured if the slits are formed at a pronounced angle to the axis of the tire, while in dealing with other tires it is desirable to form a diamond-shaped pattern and in others to form separate sets of slits at opposite sides of the tread while leaving the central zone intact.

The object of the present invention is to provide a process and machine adapted for carrying out conveniently and efficiently the operations above described which have heretofore been outside the scope of any available equipment.

The nature and features of the invention will be best understood and appreciated from the following description of preferred embodiments of the machine selected for purposes of illustration and shown in the accompanying drawings in which.

Figure 1:
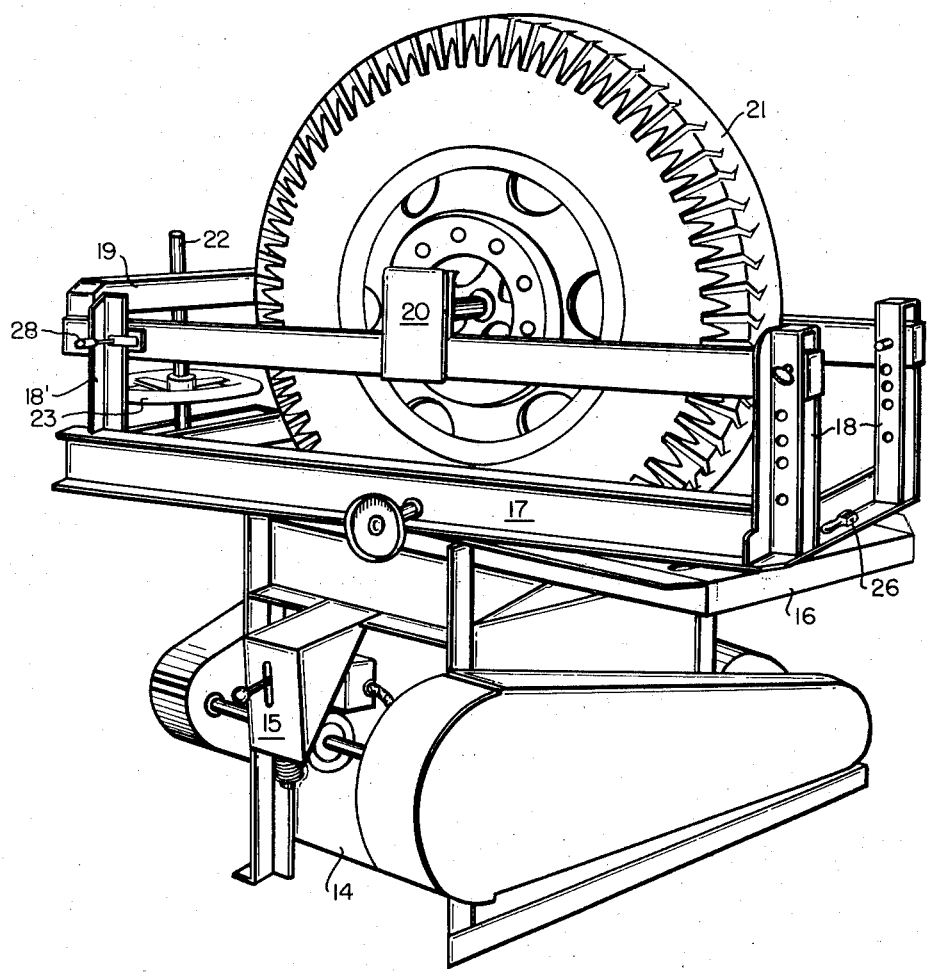
Figs. 1 and 2 are, respectively, views in elevation and plan of a machine having provision for widely varying the slitting angle in a horizontal sense.

The operative element of the machine is similar to that disclosed in our said prior patent, namely, a drum 10 rotatable about a horizontal axis and provided circumferentially with a helical thread of unsharpened buttress type well adapted to impress corresponding grooves temporarily in the yielding material of a tire tread pressed against the threads and so to rotate the tire in worm and wheel fashion and without cutting it. A cutting or slitting knife 11 is located midway between the ends of the drum and eccentrically mounted so that the effective cutting height of the knife increases progressively from its leading to its trailing section. As herein shown the knife extends approximately 90° in length and is helical in shape corresponding to the pitch of the thread of the drum.

The drum 10 is mounted upon a shaft 12 journaled in a stationary base 14 and driven by a motor 13 through suitable connections not shown. The motor is controlled by a switch 15 secured to the front of the frame. The base includes a horizontal table apertured above the drum 10. Upon this rests a horizontally adjustable carrier 17 for the tire. At one end the carrier has a pair of upright posts 18 provided with corresponding rows of holes and these are utilized to make pivotal connection with a yoke 19 provided with bearings 20 for a transverse shaft upon which the tire 21 is rotatably mounted. The front end of the yoke is guided for vertical movement between upstanding posts 18' and is connected to the base of the carrier by means of a vertical screw 22 having a hand wheel 23 by which the forward end of the yoke 19 may be swung downwardly to force the lower side of the tire into operative relation with the spiral thread of the drum 10. The vertical position of the fulcrum of the yoke 19 may be adjusted up and down upon the posts 18 in accordance with the diameter of the tire to be siped.

Figure 2:
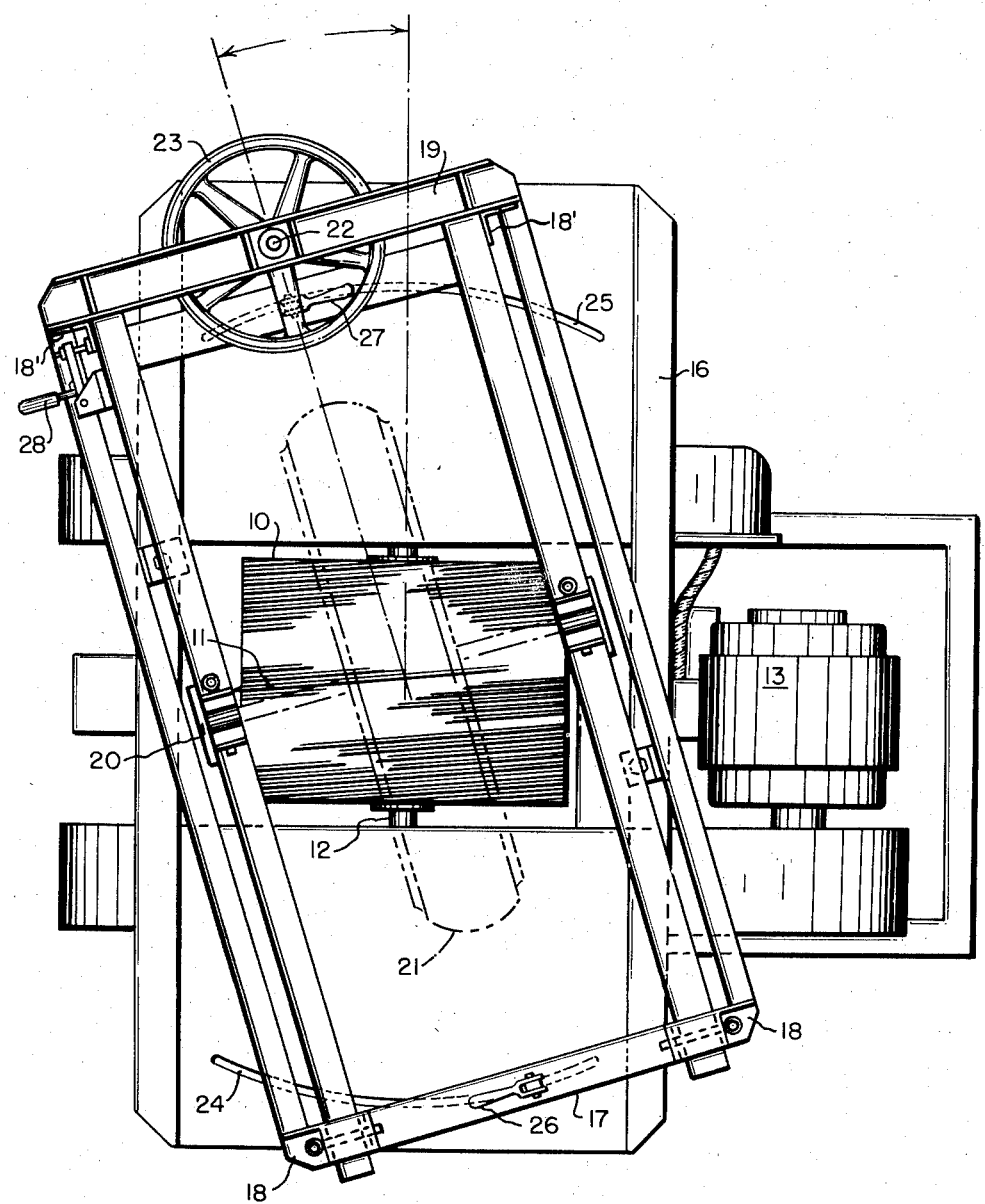

The table of the base is provided at its ends with oppositely arranged arcuate slots 24 and 25 described about the vertical axis of the drum 10 as a center. The carrier 17 is provided at opposite ends with toggle bolts 26 and 27 which slide in these slots and constrain the carrier to angular movement in a horizontal plane about the same axis. The carrier may be locked in any adjusted position by means of the toggle bolts 26 and 27. As shown in Fig. 2 it is swung contra-clockwise through an angle of about 13° and the full range of adjustment is indicated to be about 60°. An auxiliary clamp 28 is shown as on one arm of the yoke 19 cooperating with one of the vertical posts 18'.

Figure 5:
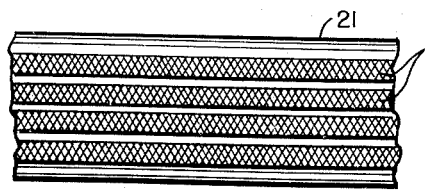

It will be apparent that by appropriate adjustment of the carrier 17 the tire 21 may be forcibly pressed against the drum 10 in such angular relation as to produce transverse slits disposed all parallel to or at any desired angle of inclination with respect to the axis of the tire; or by subjecting the tire to two siping operations with the carrier set at different angles a diamond-shaped pattern may be produced like that indicated at 39 in Fig. 5, or the slits may be caused to intersect and so provide intermediate areas that taper transversely in either direction.

Figure 3:
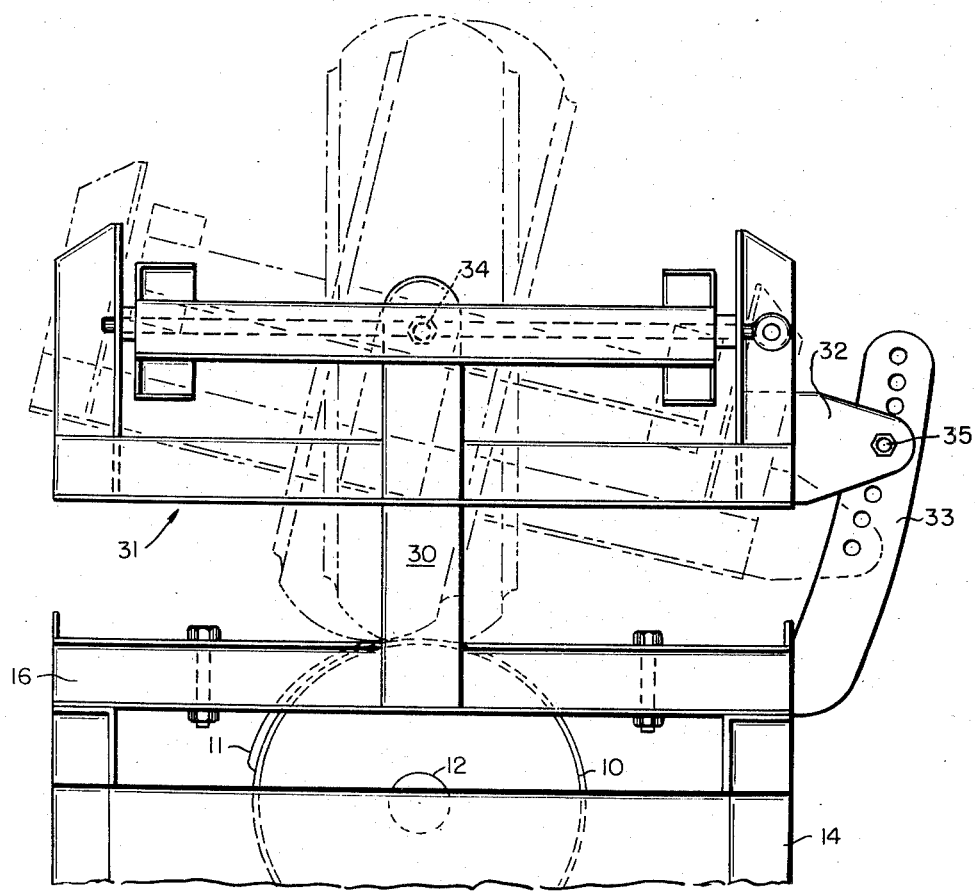
Fig. 3 is a fragmentary end view of a machine adapted for varying the location of the slits in a vertical sense.

In Fig. 3 the machine is shown as equipped with a carrier 31 arranged for angular adjustment about a horizontal instead of a vertical axis. In this modification the base is provided at opposite ends with upstanding posts 30 and the carrier 31 is suspended between these posts upon aligned horizontal spindles 34.

In the carrier are provided bearings for a transverse shaft or arbor upon which the wheel with its tire is rotatably mounted. The carrier also has an arm 32 at one side arranged in cooperative relation with a stationary perforated segment 33 fast to the base and to which the carrier may be secured in any desired position of angular adjustment by a bolt 35 passed through any selected hole in the segment 33.

Figure 4:
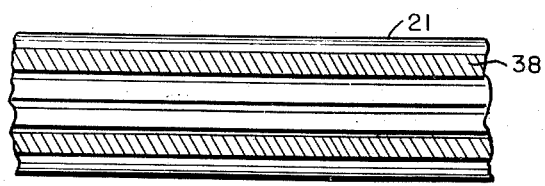
Figs. 4 and 5 are fragmentary views showing slitting patterns of two different characters.

The structure shown in Fig. 3 permits the tire to be presented to the drum 10 in such position as to slit first one side of its tread surface and then the other side while leaving the center zone of the tread intact as suggested at 38 in Fig. 4. It will be understood that in all these operations the tire is partially deflated and mounted upon its wheel or a carrier rim which, in turn, is rotatable upon the transverse arbor of the carrier.

It has been found that different types of tires operating under different conditions may be most advantageously siped in accordance with one or other of the patterns above described. These various patterns have been formed in the tires of buses, trucks, tractors and airplanes among others. In all instances the siping has been found to improve the braking and non-skid action of the tires, to increase their life, and improve the wear pattern. Siping also makes softer the riding of the vehicle and reduces road noise.

Having thus disclosed our invention and described in detail preferred embodiments thereof, we claim as new and desire to secure by Letters Patent:

1. A tire slitting machine comprising a continuously rotated spirally threaded drum having threads of a height and nature temporarily to indent and feed a tire forwardly but not to cut the same, a continuously driven slitting knife located between the ends of the drum, conforming to the spiral shape of the threads and projecting beyond them to slit the tire, and a frame having means for supporting the tire on said drum so as to be driven thereby and having provision for angular adjustment with respect to the axis of the drum to determine different angles of slitting the tire.

2. A machine of the character defined in claim 1 in which the frame is movable horizontally and has provision for angular adjustment in both directions with respect to the axis of the drum whereby the tire may be slit in diamond pattern.

3. A machine of the character defined in claim 1 in which the frame is movable angularly and downwardly to present the tire at an inclination to the drum for slitting the side walls of its tread portion.

4. The process of slitting tires which is characterized by progressively conforming the tread of a tire, in successive areas, to the contour of a spiral thread, rotating the tire by turning the spiral thread while it temporarily indents but does not cut the tire and moving a knife through the tread of the tire in a path corresponding to the pitch of said spiral thread and following the formation of the indentations made by the threads while presenting the tire to the threads first at one angle and then at another angle with respect to the axis of the thread thereby producing a diamond pattern formed by angularly intersecting slits.

5. A tire siping machine comprising an externally threaded drum carrying a helical slitting knife and being rotatable about a fixed axis, in combination with a tire carrier having means for rotatably supporting a tire and being mounted for angular adjustment with the tire, and means for locking the carrier in different positions of angular adjustment with respect to the drum.

6. A tire siping machine as described in claim 5 in which the carrier is mounted above the drum and is angularly adjustable about a vertical axis passing through the center of the drum.

7. A tire siping machine as described in claim 5 in which the carrier is mounted above the drum and is angularly adjustable about a horizontal axis passing through the center of the tire supported therein.

8. A tire siping machine having a base, an externally threaded drum mounted therein and driven about a fixed axis, a carrier frame mounted upon the base for angular adjustment with respect to the axis of the drum, a tire carrying shaft in the carrier, and means for forcibly moving the shaft toward the drum to conform a tire thereto in any angular position of the carrier.

References Cited in the file of this patent
UNITED STATES PATENTS

| | | |
|---|---|---|
| 1,934,181 | Fouke | Nov. 7, 1933 |
| 2,109,691 | D'Ayguesvives | Mar. 1, 1938 |
| 2,294,047 | Pollock | Aug. 25, 1942 |
| 2,364,384 | Oakes | Dec. 5, 1944 |
| 2,741,307 | Meserve et al. | Apr. 10, 1956 |

FOREIGN PATENTS

| | | |
|---|---|---|
| 90,759 | Sweden | Nov. 9, 1937 |